(No Model.)
C. H. RUDD.
METHOD OF MEASURING THE STRENGTH OF MAGNETS.
No. 483,168. Patented Sept. 27, 1892.
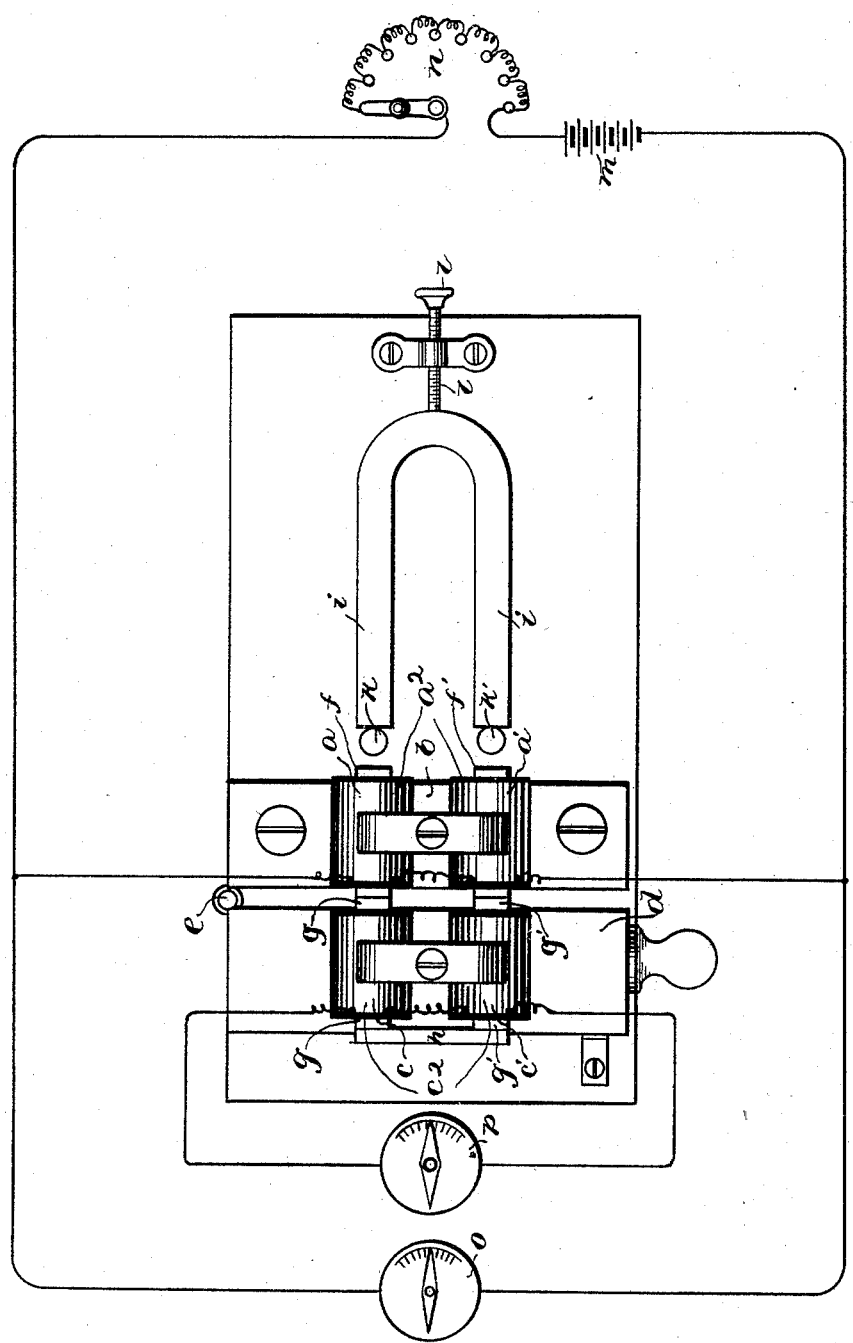
Witnesses:
George L. Cragg.
Ella Edler.
Inventor:
Charles H. Rudd
by Barton & Brown
Attorneys.

UNITED STATES PATENT OFFICE.

CHARLES H. RUDD, OF EVANSTON, ASSIGNOR TO THE WESTERN ELECTRIC COMPANY, OF CHICAGO, ILLINOIS.

METHOD OF MEASURING THE STRENGTH OF MAGNETS.

SPECIFICATION forming part of Letters Patent No. 483,168, dated September 27, 1892.

Application filed November 6, 1891. Serial No. 411,091. (No model.)

*To all whom it may concern:*

Be it known that I, CHARLES H. RUDD, a citizen of the United States, residing at Evanston, in the county of Cook and State of Illinois, have invented a certain new and useful Improvement in the Art of Measuring the Strength of Magnets, (Case No. 14,) of which the following is a full, clear, concise, and exact description, reference being had to the accompanying drawing, forming a part of this specification.

My invention relates to the measurement of the strength of magnetization of magnets. Its object is to provide a simple and efficient method of making such measurement for practical purposes.

My invention comprises a method of balancing the inductive effect of the magnet to be measured upon an iron core by a magnetic field of known or calculable value, and in an improved method of determining when the magnetic induction of the permanent magnet is exactly balanced.

In practicing my invention I arrange a bar of soft iron so as to complete or continue the magnetic circuit of the magnet whose strength of magnetization is to be measured. Surrounding this bar I provide two coils, one of which is in circuit with a battery or other source of electricity and suitable means for measuring and varying the current therefrom, and the other of which is in circuit with a galvanometer. I choose to term the first coil described the "balancing-coil" and the second the "test-coil." By adjusting the current in the balancing-coil I create a field about the soft-iron bar of such strength as to bring the induction through the said bar to an amount just sufficient to balance the induction due to the magnetization to be measured. This point of balance I determine by interrupting the magnetic continuity of the soft-iron bar, when, if the induction due to either the magnetism of the magnet or the field of the balancing-coil predominates, a current will be induced in the coil depending in volume upon the magnitude of the difference between the two forces and in direction upon the resultant direction of the induction through the system, and this induced current will be indicated by the galvanometer. When by successive trials the two magnetizing forces acting upon the soft-iron bar have been brought to equal amounts, the strength of the current in the balancing-coil may be measured. The value of the balancing-current furnishes a basis for calculating the value of the magnet tested.

If the number of turns in the balancing-coil be known and the permeability of the entire magnetic circuit, the absolute value of the magnetization of the tested magnet may be calculated in a well-known manner; but in practice it is not usually necessary to have more than a comparative value in terms of some standard magnet. In this case the magnetizations of two magnets of similar form and equal weights would be to each other as the currents required to balance them respectively.

In the accompanying drawing I have shown a suitable form of apparatus for carrying out my invention as in the act of measuring the strength of a permanent horseshoe-magnet.

In the drawing $a$ $a'$ are helices which together I call the "balancing-coil" $a^2$. They are firmly clamped to a base $b$.

$c$ $c'$ are the helices of the testing-coil, rigidly clamped to a block $d$, which is hinged at $e$ and is movable with respect to base $b$. The helices of the balancing-coil $a^2$ and of the testing-coil $c^2$ are provided with soft-iron cores $f f'$, $g g'$, respectively. The cores $f g f'$ $g'$, respectively, abut upon each other and the adjacent ends are smoothly finished to insure good magnetic contact. The free ends of cores $g g'$ are joined together by a soft-iron yoke $h$. Thus when the apparatus is in the position shown the magnetic circuit is practically continuous through cores $f g$, yoke $h$, and cores $f' g'$.

The magnet $i$ to be tested is placed upon the base with its poles opposite and near to the free ends of cores $f f'$, and is secured firmly in a definite position relatively to the testing and balancing coils by being clamped against stops $k$ $k'$ by set-screw $l$. The coil $a^2$ is connected in circuit with a source of electricity $m$ and an adjustable resistance $n$. A voltmeter $o$ is connected in shunt of coil $a$, whereby, since the resistance of this coil is constant and known, the current through it may readily be determined. A galvanometer $p$ is connected in circuit with testing-coil $c^2$. With the apparatus thus arranged the magnetic circuit is repeatedly broken and made by striking slight blows upon block $d$, carrying testing-coil $c^2$, so as to disengage cores $g\ g'$ from cores $f\ f'$, while the variable resistance $n$ is adjusted until no deflection of the needle of galvanometer $p$ occurs, when the magnetic circuit is completed or interrupted. The magnetizing force of coil $a^2$ is then balanced against and hence equal to that of the magnet $i$. The value of the current in coil $a^2$, as deduced from the voltmeter reading, is then compared with the value of a current necessary to balance a standard magnet under the same conditions. The ratio thus obtained is the ratio of the inductions or numbers of lines of force through the two magnets. The practical value of magnets may not always be proportional to the values thus obtained. Thus, since the tractive strength of a magnet acting upon an armature in contact with its poles is proportional to the square of the number of lines of force traversing the magnet, the value of a magnet designed to act under such a condition would be proportional to the square of the current balancing it, or to the energy consumed in the balancing-coil. Again, the practical value of a magnet designed as a field-magnet for a magneto-machine would be as the square of the current required to balance it, since with a given armature revolving at a constant speed the output in watts of the armature will be proportional to the square of the total number of lines of force set up by a given field-magnet, for the given field-magnet will generate an electro-motive force in direct proportion to its number of lines of force, which, since the resistance of the armature-circuit remains constant, would increase the current of the armature in the same proportion.

The value of magnets designed for other uses may be deduced from the total induction through the iron as measured by my method by well-known formulas to suit different cases.

Having thus described my invention, I claim as new and desire to secure by Letters Patent—

1. The method of measuring the strength of magnets, which consists in balancing the magnetic field of the magnet by a counter-magnetic field generated by an electric current, measuring said current, and comparing the value of the current with the current required to balance a standard magnet, substantially as herein described.

2. The method of determining when a balance is effected between two magnetic fields, which consists in interrupting the magnetic continuity of a bar of magnetic material placed in the fields and in the direction of the lines of force and surrounded by a coil in circuit with a suitable current-detector and noting the presence or absence of currents in the said coil, substantially as herein described.

3. The method of effecting a balance between two magnetic fields acting in opposite directions, which consists in interrupting the magnetic continuity of a bar of magnetic material placed along the lines of force of the fields and surrounded by a coil connected in circuit with a suitable current-detector and adjusting the strength of one of the fields until no current is created in the said coil when the continuity of the bar is completed or interrupted, substantially as herein described.

4. The method of measuring the strength of magnets, which consists in creating by means of a current a field in opposition to the field of the magnet to be measured, effecting a balance between the two fields by adjusting the strength of the field-producing current until no current is induced in a coil surrounding a bar of magnetic material placed in the fields along the lines of force when the magnetic continuity of said bar is interrupted or completed, and comparing the strength of current required to balance the magnet-field with the strength of current required to balance the field produced by a standard magnet, substantially as herein described.

In witness whereof I hereunto subscribe my name this 21st day of September, A. D. 1891.

CHARLES H. RUDD.

Witnesses:
FRANK R. MCBERTY,
GEORGE L. CRAGG.